March 2, 1971   J. L. COOK ET AL   3,567,524
METHOD OF PRODUCING MOLDING AND THE PRODUCTS OF THIS METHOD
Filed Dec. 13, 1968   4 Sheets-Sheet 1

INVENTORS.
JACKIE L. COOK
WILLIAM G. RALSTON
BERNARD E. TOBEN

March 2, 1971     J. L. COOK ET AL     3,567,524
METHOD OF PRODUCING MOLDING AND THE PRODUCTS OF THIS METHOD
Filed Dec. 13, 1968     4 Sheets-Sheet 2

March 2, 1971   J. L. COOK ET AL   3,567,524

METHOD OF PRODUCING MOLDING AND THE PRODUCTS OF THIS METHOD

Filed Dec. 13, 1968   4 Sheets-Sheet 3

United States Patent Office 3,567,524
Patented Mar. 2, 1971

3,567,524
METHOD OF PRODUCING MOLDINGS AND THE PRODUCTS OF THIS METHOD
Jackie L. Cook, Oak Ridge, Tenn., and William G. Ralston and Bernard E. Toben, Lexington, Ky., assignors to International Business Machines Corporation, Armonk, N.Y.
Filed Dec. 13, 1968, Ser. No. 783,640
Int. Cl. C22f 1/16
U.S. Cl. 148—11.5     23 Claims

ABSTRACT OF THE DISCLOSURE

Wall thinning of moldings made by pressure deformation is avoided by locally preconditioning the material structure of a sheet of suitable material, for example, a superplastic metal. The preconditioning includes a heat treatment of the material structure in selected portions of the sheet to reduce the strain plasticity in these portions during the forming process.

BACKGROUND OF THE INVENTION

Field of the invention

This invention relates to the producing of moldings by pressure deformation, and particularly to a method of maintaining an initial wall thickness in moldings made by pressure deformation as well as the intermediate and final products made by this method.

Description of prior art

U.S. Pat. No. 3,340,101, "Thermoforming of Metals" by D. S. Fields, Jr., Daniel L. Mehl and B. F. Addis, filed Apr. 2, 1965, issued Sept. 5, 1967, and assigned to the same assignee as this application, discloses a method of forming metals which exhibit superplastic behavior. The process is similar to that used in the plastic and glass industry for stretching or tensile-deforming various polymers, silicates and like non-metallic materials. A die is used having a shape which is substantially complementary to the shape desired to be produced. The material to be formed is placed adjacent the die and is conditioned to exhibit superplastic behavior. This is done by heating the material to a critical temperature at which the material shows effective strain rate sensitivity. Then the deforming force is applied causing the material to deform into close contact with the surface of the die.

During this deforming process, stretching and thinning of the material in certain stress areas will take place. The material thinning depends from the stress concentrations caused by the geometry of the die. As a result, relatively thin walls can occur in these stress areas. By special shaping of the die it is possible to reduce the undesired effect, but in certain die configurations, especially if the die is relatively deep, wall thinning is still a serious problem in spite of these shaping measures.

In the shaping of thermoplastic sheets it is known to selectively heat local areas of the thermoplastic sheet during the thermoforming process in order to effect differential plasticity in the material and to avoid excessively thinning the walls of the article desired to be formed. This method requires differential heat control of the die in the course of the forming process. For that reason the costs of the die or shaping arrangements are relatively high, and in certain cases, for example if the die is small or if the geometry of the die is complicated, the application of such a method is difficult or quite impossible.

In U.S. Pat. No. 3,530,699 entitled, "Method of Improving Thermoformed Components" by E. C. Uberbacher issued Sept. 29, 1970, assigned to the same assignee as this application, a method is suggested to overcome the problem of undesired thinning of the walls of the component to be shaped from a sheet of material. This method provides making a test component and determining from this test component the areas where thinning of the walls has occurred and the extent it has taken place. According to the result of the test, a special die is produced by which said sheet of material is preformed so as to have an additional thickness in the stress areas defined by means of the test component. According to this method an additional die has to be produced and in the course of producing moldings an additional time consuming forming step is necessary for each molding to preform the sheet thickness.

Accordingly, it is the principal object of this invention to control the wall thickness of thermoformed moldings without differential heat control of the die or preforming the thickness of the material to be shaped.

Another object of this invention is to avoid undesired wall thinning in portions of substantial stress concentrations during the thermoforming of moldings.

Still another object of this invention is to precondition a sheet of material suitable to be used for forming moldings at a later time and at another place.

SUMMARY OF INVENTION

In accordance with one aspect of the invention, the following steps are provided for making moldings from a blank material which is capable of being substantially strained and having substantial plasticity.

The material structure of the blank material is locally treated so as to later replace the plasticity in certain portions of the sheet when the forming process is taking place. This treating is performed before starting the forming process and can be performed separately from the forming process. The portions to be treated are selected according to the areas which are to maintain the initial thickness of the blank material. This material can be a sheet of superplastic metal or another suitable material, for example, a nonmetallic plastic material. The treatment of the material structure can be performed by heat treatment or by another suitable measure for changing the material structure. If a sheet of superplastic metal is used, the heat treatment includes locally treating the sheet above a specific forming temperature at which this material exhibits a substantial plasticity or heating of the whole sheet above the forming temperature and thereafter locally quenching the selected portions at a slow rate and the remaining portions at a much more higher rate. Instead of heat treating, the structure of certain portions of the superplastic metal sheet can also be modified by local diffusion of a second metal to achieve the same purpose.

It is an advantage of the subject invention to avoid differential heat control of the die for maintaining a desired wall thickness of the produced moldings as well as the producing of a special die for preforming the material to prevent undesired wall thinning of the moldings.

The molding produced by the predescribed method have in accordance with another aspect of this invention a changed material structure in those portions which were prepared for maintaining the initial thickness of the sheet material. Similarly, the sheet material prepared according to this invention for forming moldings at a later point of time have a modified material structure in those portions to prevent undesired thinning of material thickness.

The foregoing and other objects, features and advantages of the invention will be apparent from the following description of several preferred embodiments of the invention. In the description, reference is made to the accompanying drawings in which.

The present invention can be principally applied to metals which have effective strain rate sensitivity. Several examples of such metals, also called superplastic metals, are cited in the aforementioned U.S. Pat. 3,340,101. In addition to the material disclosed in the patent, other superplastic materials have become known; for example, a superplastic stainless steel as reported in the article "Superplasticity in the Ni-Fe-Cr System," by H. W. Hayden et al., Transactions of the ASM, vol. 60, 1967, pp. 3–13. These materials exhibit a hyperextersability if they are heated to a critical temperature. The extent to which any such material can be extended is predicable in general terms from a determination of its strain rate sensitivity and a design determination of its strain rate sensitivity. Strain rate sensitivity can be defined as $m$ wherein $$m = \frac{d \cdot \ln \delta}{d \cdot \ln \epsilon}$$

and $\delta$ is stress in lbs. per sq. inch and $\epsilon$ is strain rate in reciprocable minutes. Strain rate sensitivity is readily determined by simple and now well recognized torsion test described in the article "Determination of Strain-Hardening Characteristics by Torsion Testing," by D. S. Fields, Jr., and W. A. Backofin, published in the Proceedings of the ASTM, 1957, vol. 57, pp. 1259–1272. Maximum strain rate sensitivity in metals is seen to occur, if at all, as metals are deformed while in a metastable state near the phase transformation boundary. Accordingly, the temperature immediately below the temperature boundary between the phases in question can be expected to produce the greatest strain rate sensitivity. This temperature is thus preferred for testing and processing. For example, the alloy of 22% aluminum and 78% zinc shows superplasticity up to a critical temperature of about 530° F.

When the critical temperature of superplasticity in a material is exceeded, the superplastic behavior is lost. The superplastic behavior is not regained if the material is slowly cooled to a temperature below the critical temperature. The reason is due to a change of the crystal structure of the material. This characteristic is utilized for the purpose of the present invention.

Figure 1:
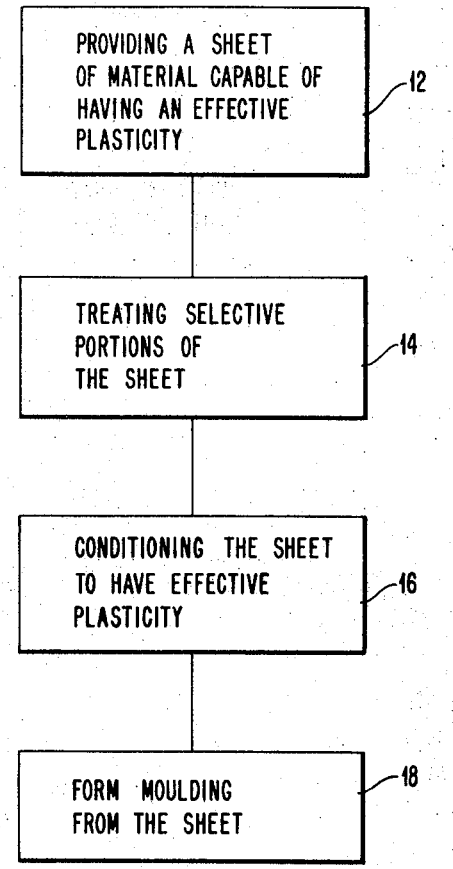
FIG. 1 is a block diagram of the steps of the process according to the present invention.

For a general explanation of the inventive method, reference is made to FIG. 1 which shows the basic steps of this method. In a first step, according to 12, a sheet of material is provided which can be brought to a condition of substantial plasticity by heating. The sheet, for example, 22 in FIG. 2, can consist of a superplastic metal of the kind described before, and has a substantial uniform thickness. In the next step at 14, the superplastic capability is destroyed or at least reduced in selected portions. The result of this treatment is a certain pattern of first portions capable of having substantial plasticity and second portions not capable of having substantial plasticity. The specific pattern can be designed in dependence of the distribution of thick and thin areas in a test component. For this purpose a parallel line pattern technique can be used for determining thin and thick areas as it is described in the aforesaid U.S. Pat. 3,530,699. The reduction of the capability to show substantial plasticity in the second portions is done, for example, by locally overheating. As described before, overheating destroys the superplasticity of superplastic metals by changing the structure of the material.

According to the step of block 16 of FIG. 1, the sheet is now conditioned to exhibit substantial plasticity, that means it will be brought on the temperature critical for an effective plasticity. It is evident that this conditioning is only effective in the first portions in which the ability to exhibit substantial plasticity has not been reduced. According to block 18, the shaping process takes place. The sheet 22 will be located adjacent to a die, as die 20 in FIG. 2. This can be done before or after the conditioning step of block 16 or also before the preconditioning step of block 14. A tensile stress is induced in the sheet material by applying a fluid pressure across the sheet material in order to deform the sheet material against and into intimate contact with the shaping surface of the die which has a geometry complementary to the form desired to be produced. In the course of this shaping process the portion in which the superplasticity has been reduced maintains the original thickness of the sheet material.

Figure 2:
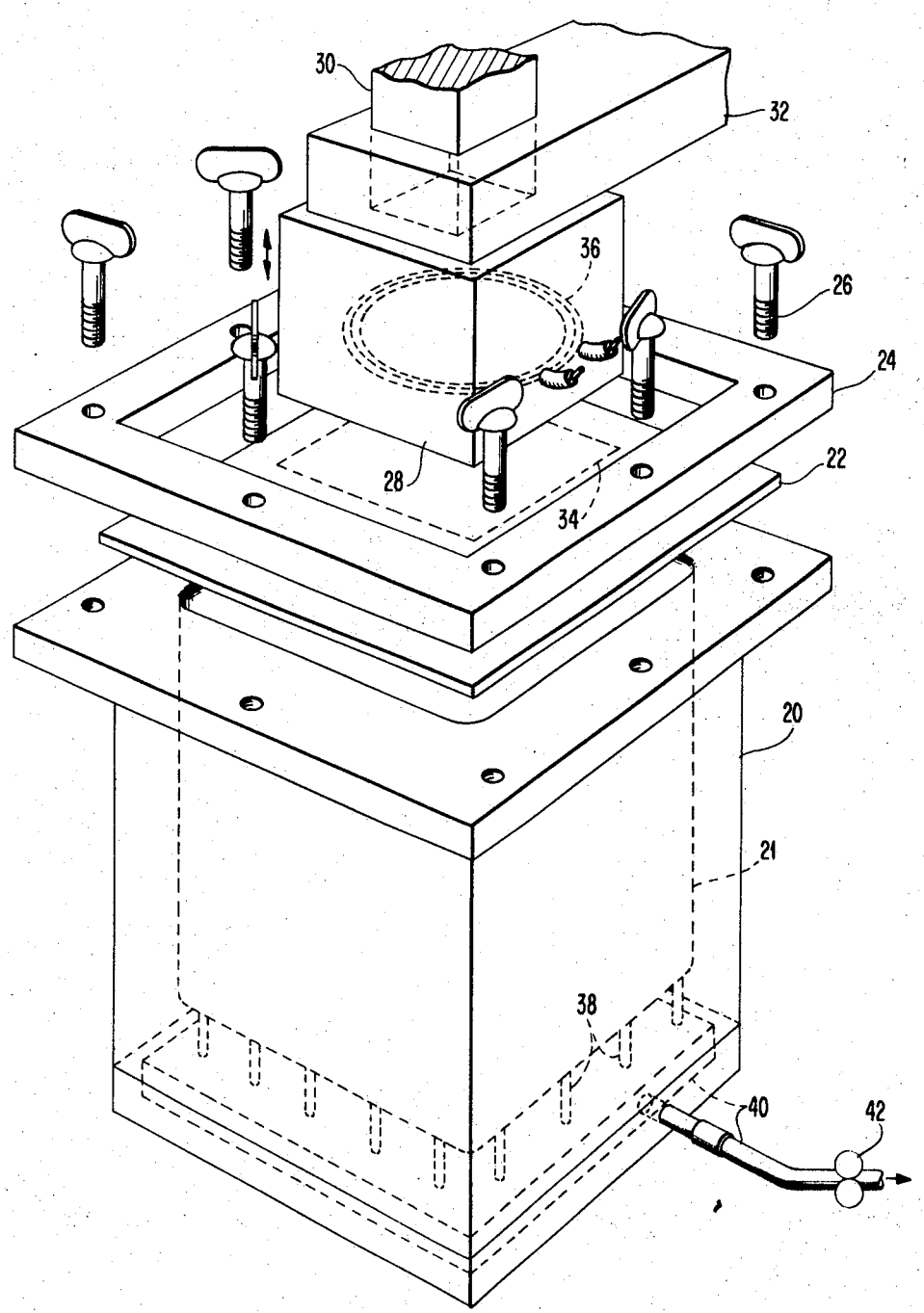
FIG. 2 is a perspective view of a typical apparatus used in performing a preferred embodiment of this invention.

Referring now to FIG. 2, an apparatus for performing the steps described in connection with FIG. 1 is shown. A die 20 which serves as the shaping member is provided with a clamping member 24. Wing bolts 26 are used for clamping the sheet 22 to be formed between the top of the die 20 and the clamping member 24. An electric heater 28 is provided which is connected to a bar 30. The block 28 and the bar 30 are vertically movably arranged in a bearing plate 32. When the sheet 22 is clamped on the top of the die 20, the heater block 28 is moved downwards to come into contact with the area 34 of the sheet 22. Then current is supplied to the heating wire 36 to heat the block 28 to a temperature which corresponds to the overheating temperature for destroying the ability of substantial plasticity in the area 34 of the sheet 22. For this purpose the bottom surface of the heater block 28 may be shaped according to the selected area to be overheated. It should be evident that for overheating a temperature is chosen which is below the melting temperature of the material used and that the heating time is accommodatingly chosen to avoid overheating of a substantial part of the surrounding of the area 34. When the area 34 of the sheet 22 has been heated to the overheating temperature, the heating current is switched off and the cooling period starts in which the area 34 is cooled by air to a temperature below the critical temperature of effective plasticity. Then the heater block is moved upwards and the whole sheet 22 is heated to the critical temperature of effective plasticity, by means not shown. At the bottom of the die 20, holes 38 are provided which are connected by an air channel 40 with a pump 42. The forming process starts with switching on of the pump for evacuating the cavity formed by the shaping surface 21 of the die, in order to apply a pressure loading across the sheet 22 for deforming the sheet according to the shaping surface of the die. Instead of using a pressure generated by evacuating the die, a positive pressure on the top surface of the sheet 22 could be provided to deform the sheet 22.

Figure 3:
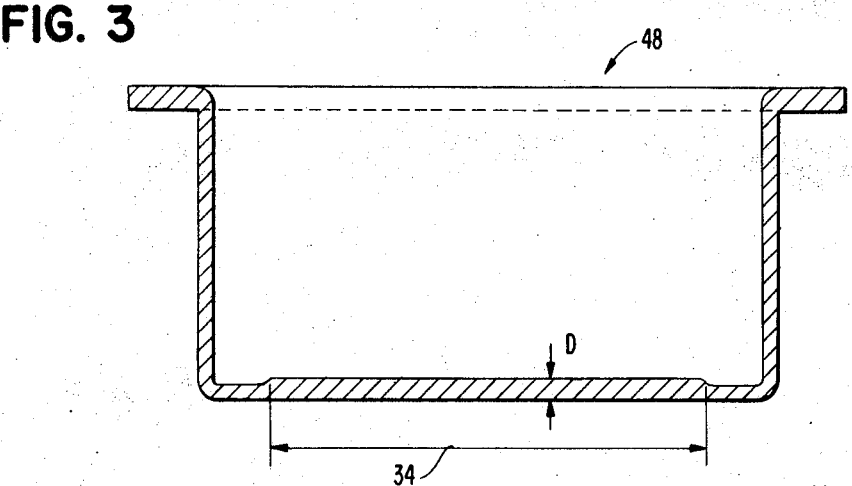
FIG. 3 is a cross-sectional view of a molding form produced according to the inventive process by means of the apparatus of FIG. 2.
Figure 4:
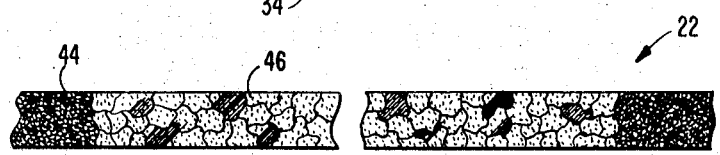
FIG. 4 is a cross-sectional view in an enlarged scale of the material structure of a part of the preconditioned sheet material prior to being formed to the shape of FIG. 3.
Figure 5:
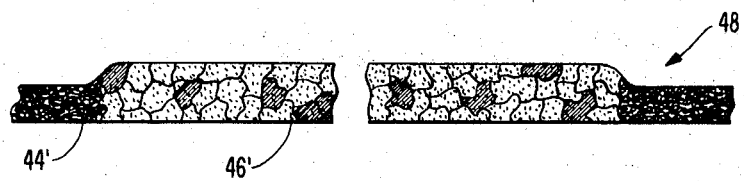
FIG. 5 is an enlarged cross-sectional view of the material structure of the finished molding disclosed in FIG. 3.

FIG. 3 shows a cross-sectional view of a shell-like form 48 produced by means of an apparatus as it is illustrated in FIG. 2. A part of the preconditioned sheet material from which the molding of FIG. 3 has been shaped is shown in FIG. 4 in enlarged scale. In this example the sheet material is an alloy of 22% aluminum and 78% zinc. FIG. 4 represents a reproduction of photomicrographs of the material structure of this alloy before the shaping process. The area 44 shows a fine grained structure typical of the cited alloy if it is fast cooled from a temperature above 530° F. The area 46 shows a much different grain structure typical of the same material if it is slowly cooled from a temperature above 530° F. The initial uniform sheet thickness is D. From FIG. 3 one can see that this thickness has been maintained in the overheated and slowly cooled area 34 (see also FIG. 2), which corresponds to area 46 of FIG. 4. FIG. 5 represents the metal structure of the bottom wall of the molding 48 of FIG. 3 in enlarged scale wherein the areas 44' and 46' correspond to the areas 44 and 46 of FIG. 4. It can be seen that the metal structure is not modified by the shaping process in the overheated area 46' while a stressing of the structure is noticeable in the area 44'.

Figure 6:
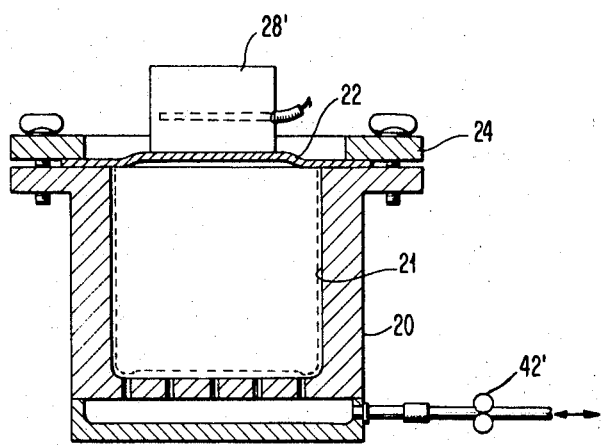
FIG. 6 is a cross-sectional view of an apparatus used in performing a modified example of this invention.

FIG. 6 represents a similar apparatus to that shown in FIG. 2 with the exception that the heater block is not movably arranged. Corresponding parts have in FIG. 6 the same reference number as in FIG. 2 and modified parts are additionally provided with a prime. In this example the conditioning step 12 (FIG. 1) is performed before the treating step 14.

The heater block 28' is arranged at a fixed distance from the top surface of the sheet 22 if the sheet is clamped between member 24 and the top of the die 20. The close contact of the heater block 28' and the sheet 22 is in this example caused by providing a pressure across the bottom surface of the sheet 22. For this purpose the pump 42' can be selectively switched over to generate positive or negative pressure in the cavity of the die. For generating an overheating temperature in the selected portion of the sheet, the running direction of the pump 42' can be switched in order to provide a positive pressure in the cavity of the die. After the sheet 22 is arranged in the clamping position between the top of the die 20 and member 24 the sheet is heated by hot air to forming temperature. Then the sheet is slightly deformed to go into close contact with the bottom surface of the heater block 28'. This is caused by generation pressure on the bottom surface of the sheet 22 by means of the pump 42'. The part of the sheet 22 being in contact with the heater is now heated above the critical temperaure. After the desired temperature has been established in the sheet 22, the pump 42' will be switched over to generate a vacuum in the cavity of the die 20 for forming the sheet according to the shaping of surface 21 in the manner described before. The arrangement of FIG. 6 has the advantage that the heater block can be fixed and no movable parts beside the sheet 22 are directly included in the shaping process. Instead of one pump to generate positive and negative pressure, two pumps can be used, one for generating positive pressure in the preconditioning phase and the second for generating the vacuum in the die.

The following example was carried out by using the apparatus according to FIG. 6 A 7 x 7 x .050 inch sheet of superplastic 22% aluminum and 78% zinc alloy was positioned on a 3" deep pan forming die 21, clamped in place, and allowed to heat to 520° F. An electrical heater 28', about 1" wide, was set at a temperature of 650° F. This heater was fixed about 1" above the sheet. Pressure was applied below the sheet, causing the sheet to come into contact with the heater. Using thermocouples to monitor the temperature, the sheet was held in contact with the heater until an area approximately 1 x 2" was heated to a temperature above the critical temperature of 530° F. During this time the remaining portion was held on forming temperature by exposing the hot air. The pressure was reduced and the sheet vacuum formed into the shape of the pan die. Examination of sections from the formed part revealed that the area which was overheated was approximately unchanged from initial thickness. The remainder of the sheet deformed as expected and as required to form the pan.

This example shows that the described procedure is successful as well as a unique method for controlling the thickness of walls of deformed parts made from superplastic material. By controlling the temperature and time of overheating, it is possible to exert some control over the superplasticity which is eliminated in a selected region. Thus, an area can be either partially or completely eliminated from the forming relative to other areas of the part. The inventive method may be also used to form areas which will be subsequently shaped into fasteners, mounting stands or bases.

Figure 7:
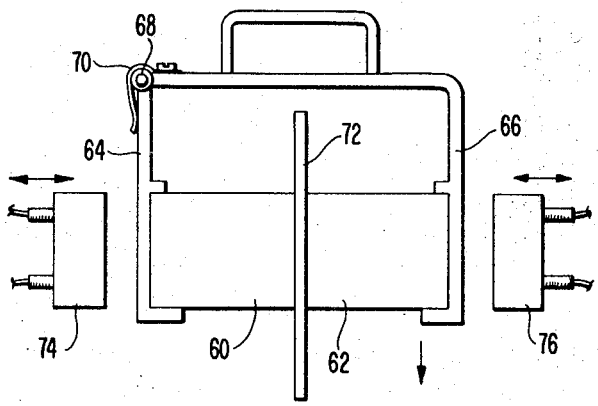
FIG. 7 is a view of a typical apparatus usable in performing another preferred implementation of the inventive method.
Figure 7:
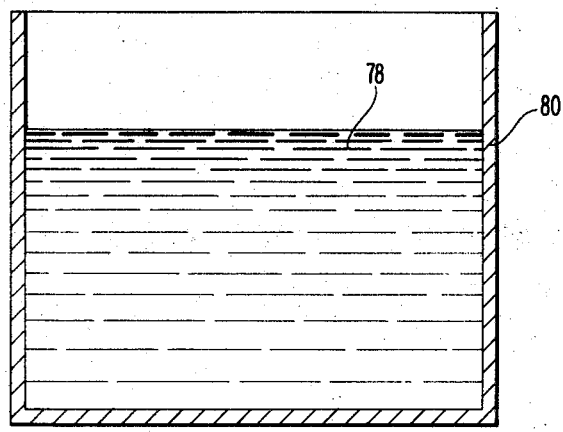

In FIG. 7 another apparatus is shown which can be used to perform a modification of the method according to the present invention. This modification is based on the fact that in the course of preparing metals exhibiting superplasticity for super plastic forming, it is necessary to rapidly quench the material heated from a temperature above the critical temperature to room temperature. This rapid quenching suppresses a transformation which would normally occur at the critical temperature, for example, 532° F. for an alloy of 22% aluminum and 78% zinc. The result is a material which is superplastic when reheated to a temperature just below the critical temperature for superplasticity. If this quench is not severe enough to lower the temperature of the entire mass of metal to a temperature about equal to room temperature in approximately 5–15 seconds, the parts of the metal which did not get a proper quench will be less superplastic than the remaining portions of the quenched sheet.

This material characteristic is utilized in the present modification of the inventive method. By varying the quenching rate, thick and thin areas can be produced in a form made from a material exhibiting superplastic behavior. The degree of severity, or lack of it, can be used as a control for the amount of superplasticity which is allowed to remain in a localized area.

This preconditioning of a sheet of metal by locally selected quenching will not be disturbed by using a rolling technique for reducing the forming time as it is described in "Metal Softening and Product Thereof," by D. S. Fields, Jr., and D. L. Mehl issued Jan. 7, 1969, assigned to the same assignee as this application.

The apparatus of FIG. 7 serves only for the locally selected quenching of a sheet of metal exhibiting superplastic behavior. For the actual forming process a shaping member will be necessary as it is shown in FIGS. 2 or 6 as die 20. The apparatus of FIG. 7 consists of two solid blocks 60 and 62 made from metal and connected with a frame which is divided in two parts, 64 and 66. The two parts of the frame are linked together by a hinge 68. A spring 70 attached on part 66 of the frame is effective to press the blocks 60 and 62 toward each other. Between the blocks 60 and 62 the sheet 72 of the material to be formed is placed. The blocks 60 and 62 have a form and are arranged to go into close contact with the sheet 72. The surfaces of the blocks 60 and 62, contacted with the sheet 72 have the same pattern as the portion of the sheet in which ability to show superplasticity is undesired. Two electrical heaters 74 and 76, for example, well known resistance heaters, can be brought into close contact with the outside of the frames 64 and 66 adjacent to the blocks 60 and 62. In this way, the blocks 60 and 62 will be heated to a temperature above the critical temperature for superplasticity of the sheet material. In a certain period of time the whole sheet 72 adapts the same temperature as the blocks 60 and 62. There is provided a tank 80 containing a cooling liquid 78. After the sheet 72 has obtained the desired temperature, the frames 64 and 66 with the blocks 60 and 62 and the sheet 72 will be immersed in the cooling liquid 78 whereby a fast quenching of those portions of the sheet 72 takes place which will come into direct contact with the cooling liquid, while the portions of the sheet which are in contact with the heated blocks 60 and 62 are quenched much more slowly. Consequently, in the latter portions the ability to exhibit a superplastic behavior will be destroyed or reduced, and in the portions directly quenched by the cooling liquid the ability of superplasticity will be maintained. The sheet 72 is subsequently formed in the same manner as described in connection with FIG. 2 or 6 in accordance with the steps 16 and 18 of FIG. 1.

Figure 8:
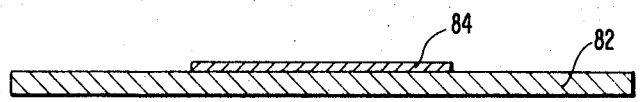
FIGS. 8 and 9 are cross-sectional views of a sheet material prepared according to other aspects of the inventive method.
Figure 9:
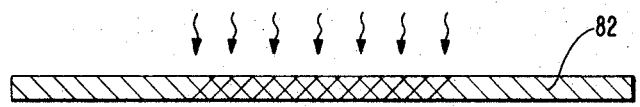

Referring now to FIGS. 8 and 9 which show a further possibility for selective reduction or destroying the original ability of substantial plasticity in a sheet of material according to the subject invention. In this modification the fact is utilized that a superplastic metal can be modified in its superplastic behavior when it is impregnated with another suitable metal. For example, the superplasticity of the alloy of 22% aluminum and 78% zinc is reduced if a substantial amount of copper is added. FIG. 8 illustrates a sheet 82 of such an aluminum-zinc-alloy which is electroplated in a selected portion with a layer 84 of copper. According to FIG. 9 the sheet 82 is held at an elevated temperature for a period of time causing the copper in a manner to diffuse into the sheet 82. Performing diffusion in this manner is known per se, for example, by J. E. Hinkel, "Diffusion of Copper Into Zn-Al to Increase Hardness," IBM Technical Disclosure Bulletin, vol. 10, No. 12, May 1968, page 1864. In the portion of the sheet 82 diffused with copper, the ability to exhibit superplasticity is substantially reduced.

In the examples described, metal sheets conditionable to show superplastic behavior are used. Similar techniques can be applied if sheets of nonmetallic materials conditionable to have an effective plasticity are used. For example, this can be done in connection with polymeric materials. It is known that the structure of the thermoplastic polymers can be changed into a condition in which these materials are no longer conditionable to be thermoplastic. For this purpose the polymers are exposed to a high energy ionizing radiation. A similar effect occurs if a sheet of thermosetting resin is locally exposed to a heating source whereby a cross-linking takes place causing the substantial plasticity of the thermosetting resin to be destroyed in the heated portions. All these and other well known techniques for modifying the structure of a sheet of material for reducing or destroying the ability to show an effective plasticity can be used within the scope of the present invention.

While the invention has been particularly shown and described with reference to several preferred embodiments thereof, it will be understood by those skilled in the art that the principles of this invention set forth above are useful either by themselves or in combination with conventional forming processes, and said various apparatus and pressure media can be used without departing from the spirit and scope of this invention.

We claim:

1. A method of making moldings from blank metallic material capable of exhibiting an effective strain rate sensitivity and substantial plasticity, including
    treating the structure of said blank material in a portion in which the thickness is desired to be maintained, to cause a lower potential plasticity in said portion than in the untreated portion of said blank material, when it is conditioned to exhibit substantial plasticity,
    conditioning said blank material to exhibit substantial plasticity in the untreated portions, and
    forming moldings by applying pressure to force the blank material into a shaping member.

2. A method according to claim 1 wherein said blank material is a sheet of metal having uniform thickness.

3. A method according to claim 2 wherein said blank material is a sheet of a zinc-aluminum alloy which exhibits substantial plasticity at a specific forming temperature and wherein said treating includes local heat treatment of said sheet of said alloy.

4. A method according to claim 2 wherein said treating step includes locally heating said metal above the specific forming temperature at which said sheet of metal exhibits substantial plasticity.

5. A method according to claim 4 wherein said local heating includes
    aranging the sheet of metal adjacent to said shaping member,
    contacting certain portions of said sheet of metal with a heating medium by applying a pressure across said sheet of metal,
    heating said certain portions over said specific forming temperature, and
    wherein the forming of moldings by a second pressure is applied in opposition to said first pressure to force said blank material into said shaping member.

6. A method according to claim 4 wherein said local heat treating includes
    heating the whole sheet of metal above a specific forming temperature at which said sheet of metal exhibits substantial plasticity,
    locally quenching at a slow rate the heated sheet of metal at those portions in which the initial thickness of said sheet is desired to be maintained, and
    quenching the remaining portions of said heated sheet at a substantial faster rate.

7. A method according to claim 1 wherein said treating includes local diffusion of a second material.

8. A method of making moldings from blank metallic material capable of exhibiting an effective strain rate sensitivity and substantial plasticity, including
    conditioning said blank material to exhibit substantial plasticity,
    treating the structure of said blank material in a portion in which the thickness is desired to be maintained, to cause a lower plasticity in said portion than in the untreated portion, and
    forming moldings by applying pressure to force the blank material into a shaping member.

9. A method according to claim 8 wherein said blank material is a sheet of metal and said treating step includes locally heating said sheet of metal above the specific forming temperature at which said sheet of metal exhibits substantial plasticity.

10. A method according to claim 9 wherein said local heating includes
    arranging the sheet of metal adjacent to said shaping member,
    contacting certain portions of said sheet of metal with a heating medium by applying a pressure across said sheet of metal,
    heating said certain portions over said specific forming temperature, and
    wherein the forming of moldings by a second pressure is applied in opposition to said first pressure to force said blank material into said shaping member.

11. A method of preparing a flat metallic material capable of exhibiting an effective strain rate sensitivity and substantial plasticity and suitable for making moldings thereof, including treating the material structure of said blank material in a portion in which the thickness is desired to be maintained to cause a lower plasticity in said portion than in the untreated portion of said blank material, when it is conditioned to exhibit substantial plasticity.

12. A method according to claim 11 wherein said flat material is a sheet of metal having uniform thickness.

13. A method according to claim 12 wherein said treating includes locally heating said sheet of metal above the specific forming temperature at which said sheet of metal exhibits substantial plasticity.

14. A method according to claim 11 wherein said treating includes
    heating the whole sheet of metal above a specific forming temperature at which said sheet of metal exhibits substantial plasticity,
    locally quenching at a slow rate the heated sheet of metal at those portions in which the initial thickness of said sheet is desired to be maintained, and quenching the remaining portions of said heated sheet at a substantial faster rate.

15. A method according to claim 11 wherein said treating includes local diffusion of a second material.

16. A molding made from a flat metallic material capable of exhibiting an effective strain rate sensitivity and substantial plasticity is provided with portions having a wall thickness which corresponds to the initial thickness of said flat material and comprising a material structure treated to reduce the ability of exhibiting substantial plasticity.

17. A molding according to claim 16 wherein said portions have a material structure obtained by locally heat treatment.

18. A molding according to claim 16 wherein said portions have a material structure treated by diffusion of a second material.

19. A sheet for making moldings consisting of a metallic material capable of exhibiting an effective strain rate sensitivity and substantial plasticity and having preselected portions in which the material structure is treated to cause a lower plasticity than in the untreated portions of said material, when it is conditioned to exhibit substantial plasticity.

20. A sheet according to claim 19 wherein the sheet consists of a metal and having a uniform thickness.

21. A sheet according to claim 19 wherein said preselected portions have a material structure treated by locally heating said sheet above the temperature at which it exhibits substantial plasticity.

22. A sheet according to claim 19 wherein said preselected portions have a material structure treated by heating said material above the temperature at which it exhibits substantial plasticity and by locally quenching said preselected portions of said sheet in a slower rate than the remaining portions.

23. A sheet according to claim 19 wherein said preselected portions have a material structure treated by diffusion of a second material.

References Cited
UNITED STATES PATENTS

| | | | |
|---|---|---|---|
| 3,340,101 | 9/1967 | Fields, Jr. et. al. | 148—11.5 |
| 3,420,717 | 1/1969 | Fields, Jr. et al. | 148—11.5 |

L. DEWAYNE RUTLEDGE, Primary Examiner

W. W. STALLARD, Assistant Examiner

U.S. Cl. X.R.

148—39